(12) United States Patent
Haener et al.

(10) Patent No.: US 11,580,434 B2
(45) Date of Patent: Feb. 14, 2023

(54) AUTOMATIC ACCURACY MANAGEMENT FOR QUANTUM PROGRAMS VIA SYMBOLIC RESOURCE ESTIMATION

(71) Applicant: Microsoft Technology Licensing, LLC, Redmond, WA (US)

(72) Inventors: Thomas Haener, Bellevue, WA (US); Giulia Meuli, Lausanne (CH); Martin Roetteler, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 16/843,733

(22) Filed: Apr. 8, 2020

(65) Prior Publication Data

US 2021/0117844 A1   Apr. 22, 2021

Related U.S. Application Data

(60) Provisional application No. 62/916,623, filed on Oct. 17, 2019.

(51) Int. Cl.
   *G06N 10/00*   (2022.01)
   *G06F 11/07*   (2006.01)
   *G06F 8/30*   (2018.01)

(52) U.S. Cl.
   CPC .............. *G06N 10/00* (2019.01); *G06F 8/311* (2013.01); *G06F 11/0712* (2013.01)

(58) Field of Classification Search
   CPC ..... G06N 10/00; G06F 8/311; G06F 11/0712; G06F 11/0709; G06F 11/076; G06F 8/41
   USPC .......................................................... 706/62
   See application file for complete search history.

(56) References Cited

U.S. PATENT DOCUMENTS

| | | | |
|---|---|---|---|
| 10,223,084 B1* | 3/2019 | Dunn | G06N 10/00 |
| 2017/0147303 A1* | 5/2017 | Amy | G06F 8/44 |

FOREIGN PATENT DOCUMENTS

| | | | |
|---|---|---|---|
| WO | 2016200747 A1 | 12/2016 | |
| WO | WO-2017053986 A1 * | 3/2017 | ......... G06F 9/45508 |
| WO | 2017087347 A1 | 5/2017 | |

OTHER PUBLICATIONS

Haener et al., "Managing Approximation Errors in Quantum Programs," arXiv:1807.02336v1, 8 pp. (Jul. 2018).

(Continued)

*Primary Examiner* — James C Kerveros
(74) *Attorney, Agent, or Firm* — Klarquist Sparkman, LLP

(57) ABSTRACT

Embodiments of the disclosed technology concern transforming a high-level quantum-computer program to one or more symbolic expressions. Because the transformations lead to symbolic expressions in the compiled code, one can extract these to arrive at symbolic resource estimates for the quantum program. In cases where these transformations do not yield closed-form solutions, they can still be evaluated many orders of magnitude faster than it was possible using other resource estimation tools. Having access to such symbolic or near-symbolic expressions not only greatly improves the performance of accuracy management and resource estimation, but also better informs quantum software developers of the bottlenecks that may be present in the quantum program. In turn, the underlying quantum-computer program can be improved as appropriate.

19 Claims, 6 Drawing Sheets

(56) References Cited

OTHER PUBLICATIONS

Amy et al., "Verified Compilation of Space-Efficient Reversible Circuits," available at: arXiv:1603.01635v1, 24 pages (Mar. 4, 2016).
International Search Report and Written Opinion issued in PCT Application No. PCT/US20/055841, dated Feb. 9, 2021, 13 pages (Ms# 407299-WO-PCT).

* cited by examiner

AUTOMATIC ACCURACY MANAGEMENT FOR QUANTUM PROGRAMS VIA SYMBOLIC RESOURCE ESTIMATION

CROSS-REFERENCE TO RELATED REFERENCES

This application claims the benefit of U.S. Provisional Application No. 62/916,623 entitled "AUTOMATIC ACCURACY MANAGEMENT FOR QUANTUM PROGRAMS VIA SYMBOLIC RESOURCE ESTIMATION" and filed on Oct. 17, 2019, which is hereby incorporated herein by reference in its entirety.

FIELD

This application concerns quantum computing devices. In particular, this application concerns techniques for generating quantum-computer-specific low-level instructions using symbolic resource estimation as part of the compilation process.

SUMMARY

Example embodiments for generating quantum-computer-specific low-level instructions using symbolic resource estimation are disclosed herein.

When translating a quantum program to target-specific low-level instructions, some high-level subroutines must be rewritten in terms of lower-level subroutines (they have to be decomposed) in a way that introduces some approximation errors. While it is possible to reduce these errors, doing so typically increases the required quantum resources (e.g., the number of operations and/or quantum bits). The programmer usually knows the overall error tolerance of the program in question. However, given this information, it is not straightforward to deduce what the best choice of accuracy parameters is for all decompositions that occur during compilation for a quantum computing device.

As a remedy, the disclosed technology concerns various improvements that automate this process and add this functionality to a quantum program compiler. In this disclosure, the resulting optimization problem can be solved using a simulated annealing procedure; furthermore this disclosure explains how this can be achieved in a way that is orders of magnitude faster. For example, in particular embodiments, the process involves transforming the code that expresses the optimization problem to symbolic expressions. Because the transformations lead to symbolic expressions in the compiled code, one can extract symbolic resource estimates for the quantum program in question. In cases where these transformations do not yield closed-form solutions, they can still be evaluated many orders of magnitude faster than possible using other resource estimation tools. Having access to such symbolic or near-symbolic expressions not only greatly improves the performance of accuracy management and resource estimation, but also better informs quantum software developers and theorists of the bottlenecks that may be present in the quantum program. In turn, the disclosed technology offers new avenues and techniques for improving the underlying quantum program.

Previous resource estimators used simulator-like methods that count operations. Such methods require executing all loops and other control flow statements in the code. By contrast, embodiments of the disclosed technology recognize these loops in the code, eliminate the loops where possible, and symbolically simplify the mathematical expression for the overall operation count and/or the total error that the quantum program introduces. This allows a developer to have a significant advent in that the method produces a concise expression for, for example, the total gate count as a function of input parameters (e.g., all input parameters), which can then be specified in order to arrive at concrete numbers. Simulator-like methods would have to re-run the entire estimation process for every new choice of parameters.

Furthermore, embodiments of the disclosed loop removal optimization methods speed up the evaluation of the resulting expression by several orders of magnitude. This is crucial when using the resource estimator as a subroutine to find the best accuracy parameters for a quantum program, since this requires many evaluations for different parameters.

Currently, no technology in the quantum-computing domain provides support for symbolic (or near symbolic) resource estimation and automatic accuracy management. Many domain experts and quantum program developers can thus not perform highly efficient resource estimation; instead, the current approaches require a considerable amount of time to understand and compute error propagation in quantum programs.

Embodiments of the disclosed technology provide a solution that enable quantum program developers to get detailed and optimized resource estimates. Furthermore, the support for symbolic resource estimates is attractive for quantum program developers and researchers working in quantum information theory and algorithms Using embodiments of the disclosed technology, they can automatically generated upper bounds on gate counts, without carrying out tedious computations by hand.

The foregoing and other objects, features, and advantages of the disclosed technology will become more apparent from the following detailed description, which proceeds with reference to the accompanying figures.

DETAILED DESCRIPTION

I. General Considerations

Figure 1:
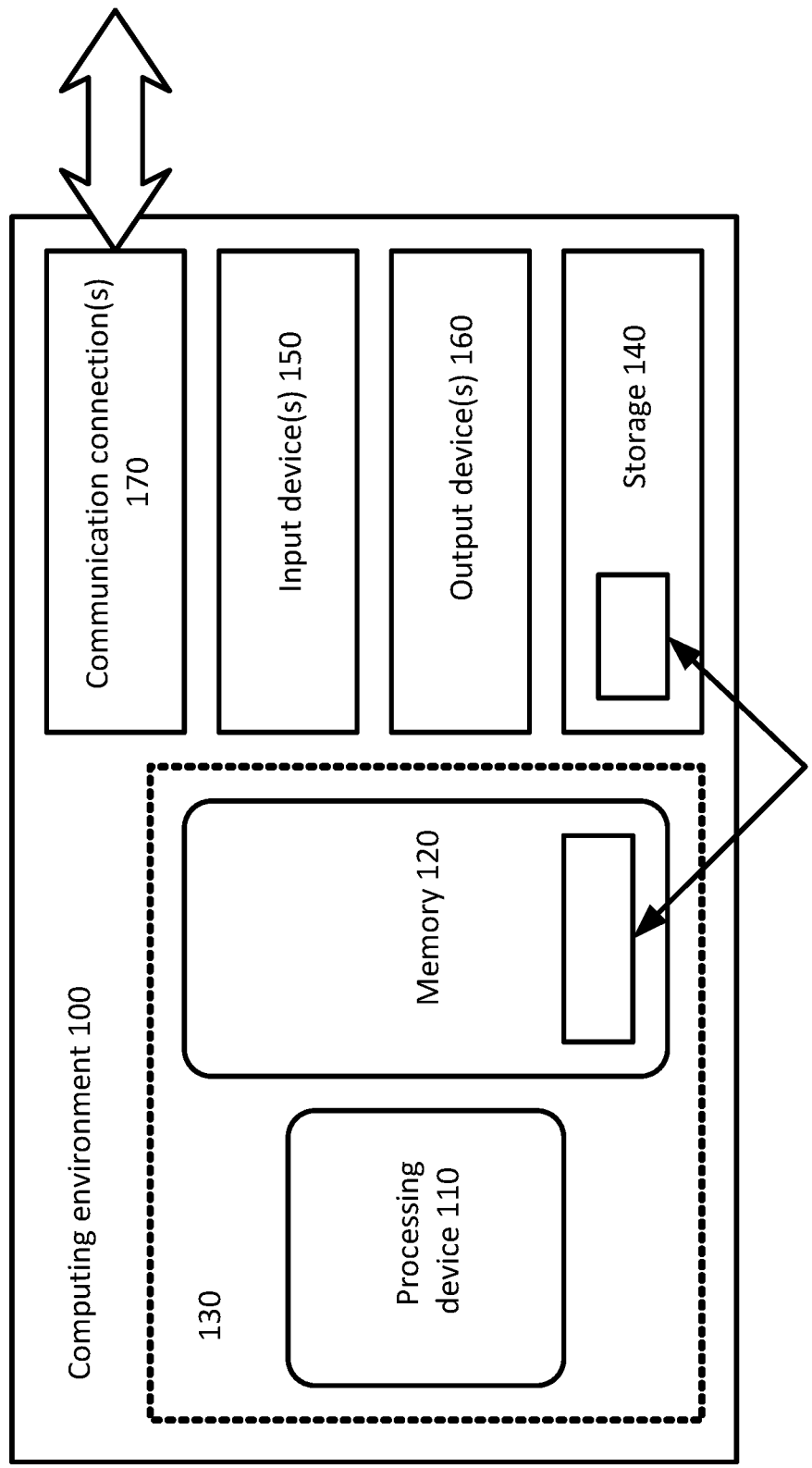
FIG. 1 illustrates a generalized example of a suitable classical computing environment in which aspects of the described embodiments can be implemented.

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Various alternatives to the examples described herein are possible. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Detailed Embodiments of the Disclosed Technology

Example embodiments of techniques for generating quantum-computer-specific low-level instructions using symbolic resource estimation are disclosed herein.

When translating a quantum program to target-specific low-level instructions, some high-level subroutines must be rewritten in terms of lower-level subroutines (they have to be decomposed) in a way that introduces some approximation errors. While it is possible to reduce these errors, doing so typically increases the required quantum resources (number of operations and quantum bits). The quantum program programmer usually knows the overall error tolerance of the program in question. However, given this information, it is not straightforward to deduce what the best choice of accuracy parameters is for all decompositions that occur during compilation.

As a remedy, the disclosed technology describes an automated process that can be used in a quantum program compiler.

In another work (see Haner et al., "Managing Approximation Errors in Quantum Programs" available at https://arxiv.org/pdf/1807.02336), it was shown how the resulting optimization problem can be solved using a simulated annealing procedure. However, that work did not touch on the specifics of how to arrive at the problem to be solved. In the present disclosure, it will be shown how this can be achieved in a way that is orders of magnitude faster. One can achieve this by transforming the code that expresses the optimization problem. Because the disclosed transformations often lead to completely symbolic expressions in the compiled code, one can extract these to arrive at symbolic resource estimates for the quantum program in question. In cases where these transformations do not yield closed-form solutions, one can still be evaluated many orders of magnitude faster than it was possible using other resource estimation tools. Having access to such symbolic or near-symbolic expressions not only greatly improves the performance of accuracy management and resource estimation, but also better informs theorists of the bottlenecks that may be present in the quantum program. In turn, this allows to improve the underlying quantum algorithm(s).

In this disclosure, exemplary methods for specifying approximate decompositions in code are described. In state-of-the-art quantum programming languages, the resulting accuracy parameters are either constant (and thus wrong in the general case) or they must be passed along with any other parameters. While the first approach will eventually fail to produce a correct quantum circuit, the second approach is impractical from the programmer's perspective.

Consider a quantum operation that calls several imperfect subroutines. Every such operation needs to be aware of all accuracy parameters introduced by itself, its subroutines, and all subroutines executed by any of its subroutines. For example,

```
qfunction f(eps1, eps2, ..., epsN, qureg):
    g(eps1, qureg[0])
    h(eps2, eps3, qureg[1-3])
    ...
    z(epsN, qureg)
``` where h(eps2, eps3, qureg[1-3]) may just pass eps3 along to one of its subroutines.

This is clearly not a scalable way to handle approximation errors. Using the disclosed technology, each subroutine is aware of exactly those accuracy parameters that affect its code directly. Furthermore, these parameters can be defined anywhere in the code.

The above example would thus read:

```
qfunction f(qureg):
    Eps my_eps;
    g(qureg[0])
    h(qureg[1-3])
    ...
    z(qureg)
``` where the implementation of f(qureg) may use my_eps in its implementation as if it were an actual number, e.g., 0.001. Clearly, this is scalable and is what embodiments of the disclosed technology supports as input. Once code has been written in this form, it can be used in the disclosed framework. In particular, the disclosed framework is illustrated by flowcharts 400 and 500 in FIGS. 4 and 5. In the illustrated framework, one or more (e.g., all) quantum subroutines are transformed in the code. In particular example implementations, this transformation adds two additional versions for one or more subroutines (e.g., each subroutine). This essentially copies the program (e.g., the entire program) twice. One copy will be determining the number of non-free operations and the second copy will keep track of the overall error that is introduced by approximate decompositions. Furthermore, in certain embodiments, one or more (e.g., all) calls to "free" operations are removed. In certain example implementations, which operations are costly/free can be specified by the programmer.

The three copies, which are functions of accuracy parameters (e.g., all accuracy parameters) that occur in the code, can be fed into an optimizer. Using repeated calls to the two added copies (computing operation count and total error), the optimizer can try to reduce the operation count while ensuring that the total error is less than a user-specified error threshold. While straightforward to implement, this approach has the same issues that previous resource estimation tools have: All loops in the quantum program are executed thousands of times during the optimization process.

As a remedy, embodiments of the disclosed technology introduce special loop optimizations that allow to remove one or more of these loops. Specifically, and in certain embodiments, loops of the form are transformed:

for i=1: n
   eps+=delta_eps;
to just
   eps+=n*delta_eps;

Doing so iteratively often allows to remove all loops in both copies of the program (for operation count and total error). With just one loop in the original program, note that n additions get replaced by just 1 addition and 1 multiplication. Taking into account that both of these operations can be executed as one fused multiply-accumulate instruction on a modern processor architecture, one can expect a speedup of approximately n, resulting in a substantial improvement. Typical quantum programs contain many nested loops. Thus, speedups of many orders of magnitude are easily possible.

Once all possible loop optimizations have been performed, including intermediate re-association and loop simplification/canonicalization, the program computing the gate count or overall error has become much simpler. In many practical examples, there is just one loop in the program, often of the form for i=1: n
   eps+=f(i)*delta_eps;

Such loops cannot be optimized further in general. However, the program is in near-symbolic form, meaning that there is a symbolic expression for f(i) and delta_eps. Thus, example embodiments of the disclosed technology, can traverse a low-level representation of the program from the final return statement (returning the gate count or total error) back to the inputs to the program, which may be unknown or compile-time constants. Loops such as the one above yield Sum-expressions that can be simplified symbolically in many cases using well-known formulas (e.g., geometric series). After simplification, the disclosed framework can output two symbolic expressions that can be used to efficiently evaluate the gate count and total error as a function of all algorithm and decomposition parameters (e.g., problem size as well as accuracy parameters of decompositions).

Also, some special cases of branching can be optimized by the disclosed framework. For example, embodiments of the disclosed technology recognize branching expressions in the low-level representation that compute the Min of two arguments. This allows one to ultimately output two upper bounds on the gate count and the overall error, respectively, using that $Sum\_i\ Min(f(i), g(i)) <= Min(Sum\_i\ f(i), Sum\_i\ g(i))$. Oftentimes, this transformation allows for further simplifications to the two sums on the right-hand side.

III. Example Computing Environments

FIG. 1 illustrates a generalized example of a suitable classical computing environment 100 in which aspects of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for performing any of the disclosed techniques for developing quantum computer programs and/or operating a quantum computer as described herein. The memory 120 can also store software 180 for synthesizing, generating, or compiling quantum circuits for performing any of the disclosed techniques.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing any of the disclosed techniques. The storage 140 can also store instructions for the software 180 for generating and/or synthesizing any of the described techniques, systems, or quantum circuits.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods and techniques for performing any of the disclosed technologies, for controlling a quantum computing device, to perform circuit design or compilation/synthesis as disclosed herein can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
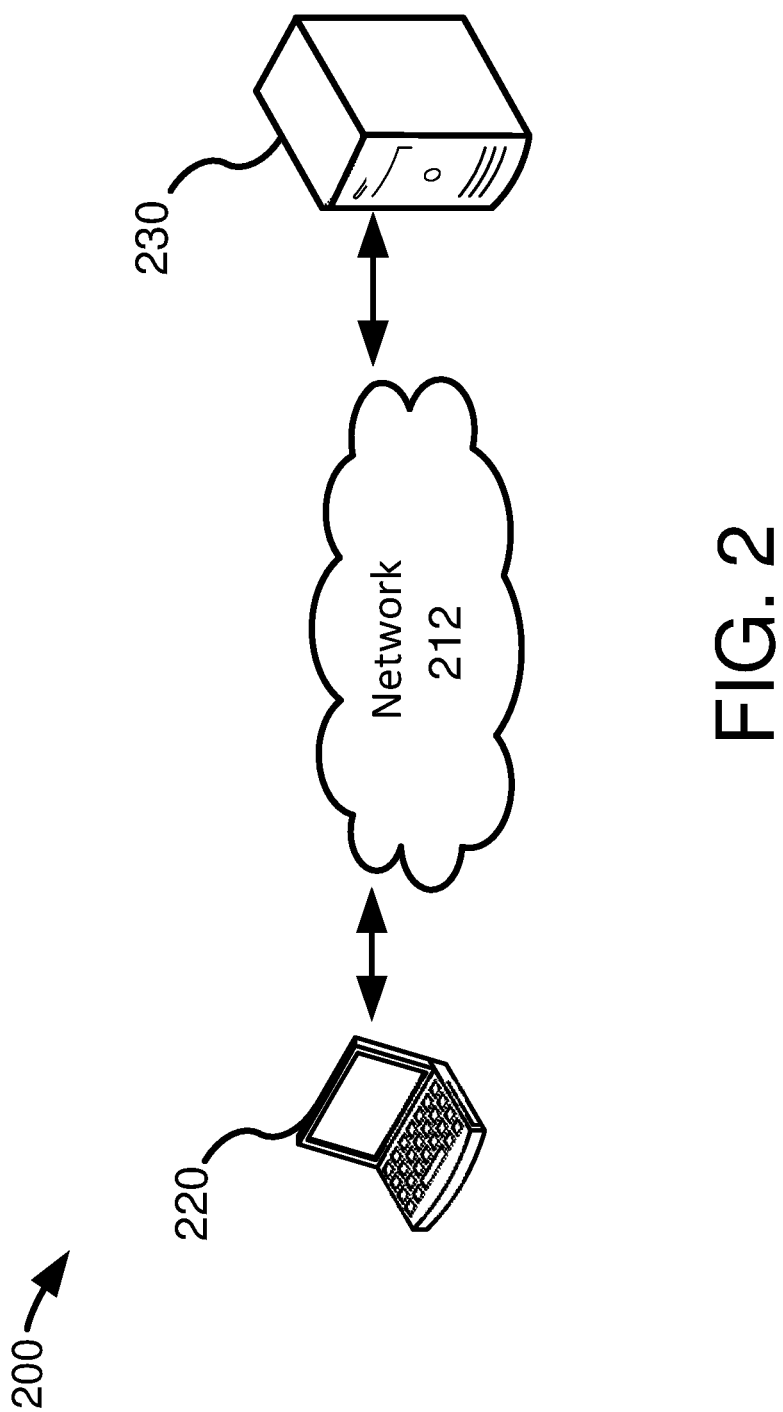
FIG. 2 illustrates an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). Further, the computing device 220 can comprise an FPGA or other programmable logic device. In the illustrated embodiment, the computing device 220 is configured to communicate with a computing device 230 (e.g., a remote server, such as a server in a cloud computing environment) via a network 212. In the illustrated embodiment, the computing device 220 is configured to transmit input data to the computing device 230, and the computing device 230 is configured to implement a technique for controlling a quantum computing device to perform any of the disclosed embodiments and/or a circuit generation/compilation/synthesis technique for generating quantum circuits for performing any of the techniques disclosed herein. The computing device 230 can output results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g., one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
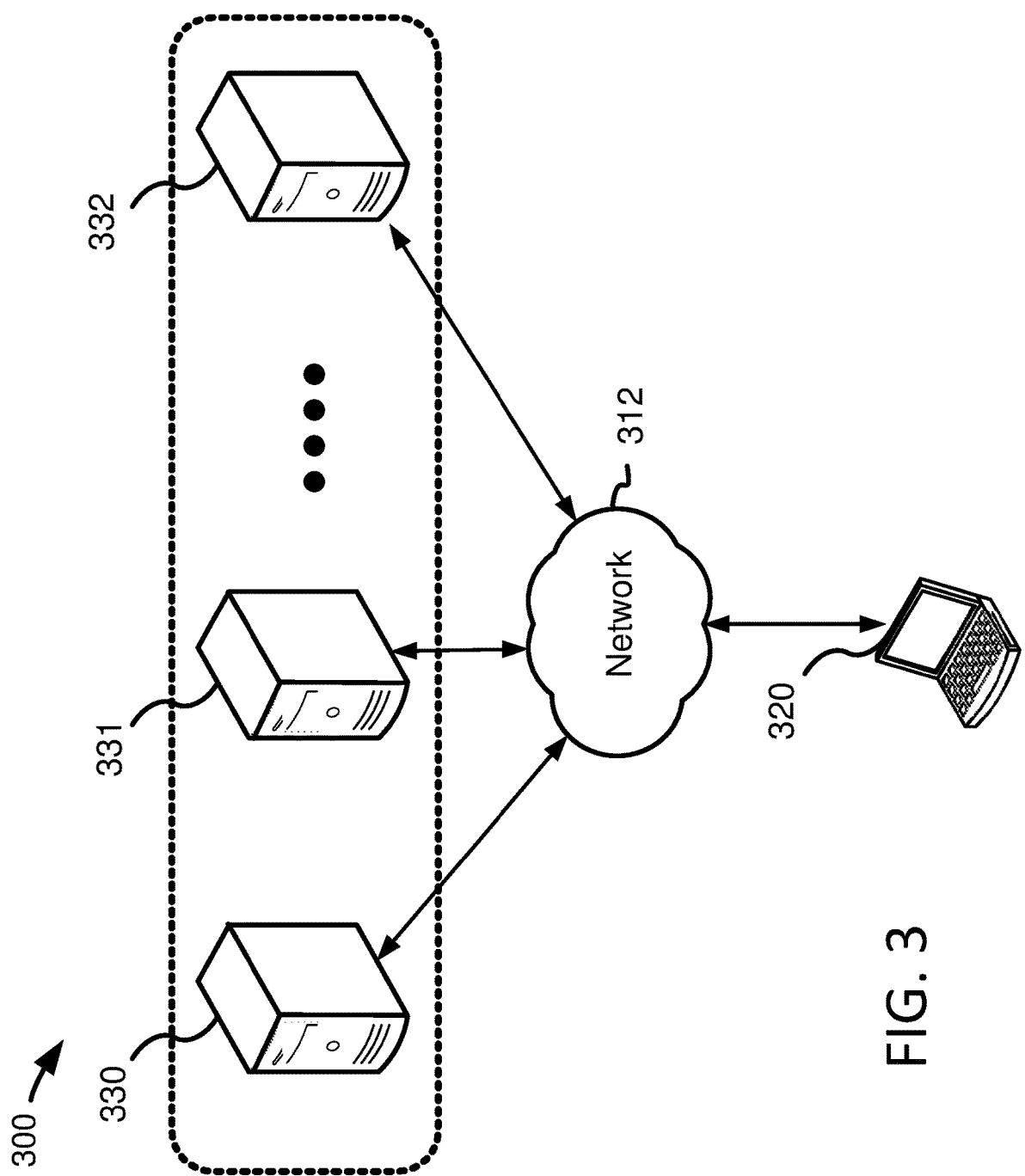
FIG. 3 illustrates another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of the disclosed technology and/or at least a portion of the technique for controlling a quantum computing device to perform any of the disclosed embodiments and/or a circuit generation/compilation/synthesis technique for generating quantum circuits for performing any of the techniques disclosed herein. In other words, the computing devices 330, 331, 332 form a distributed computing environment in which aspects of the techniques for performing any of the techniques as disclosed herein and/or quantum circuit generation/compilation/synthesis processes are shared across multiple computing devices. The computing device 320 is configured to transmit input data to the computing devices 330, 331, 332, which are configured to distributively implement such as process, including performance of any of the disclosed methods or creation of any of the disclosed circuits, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
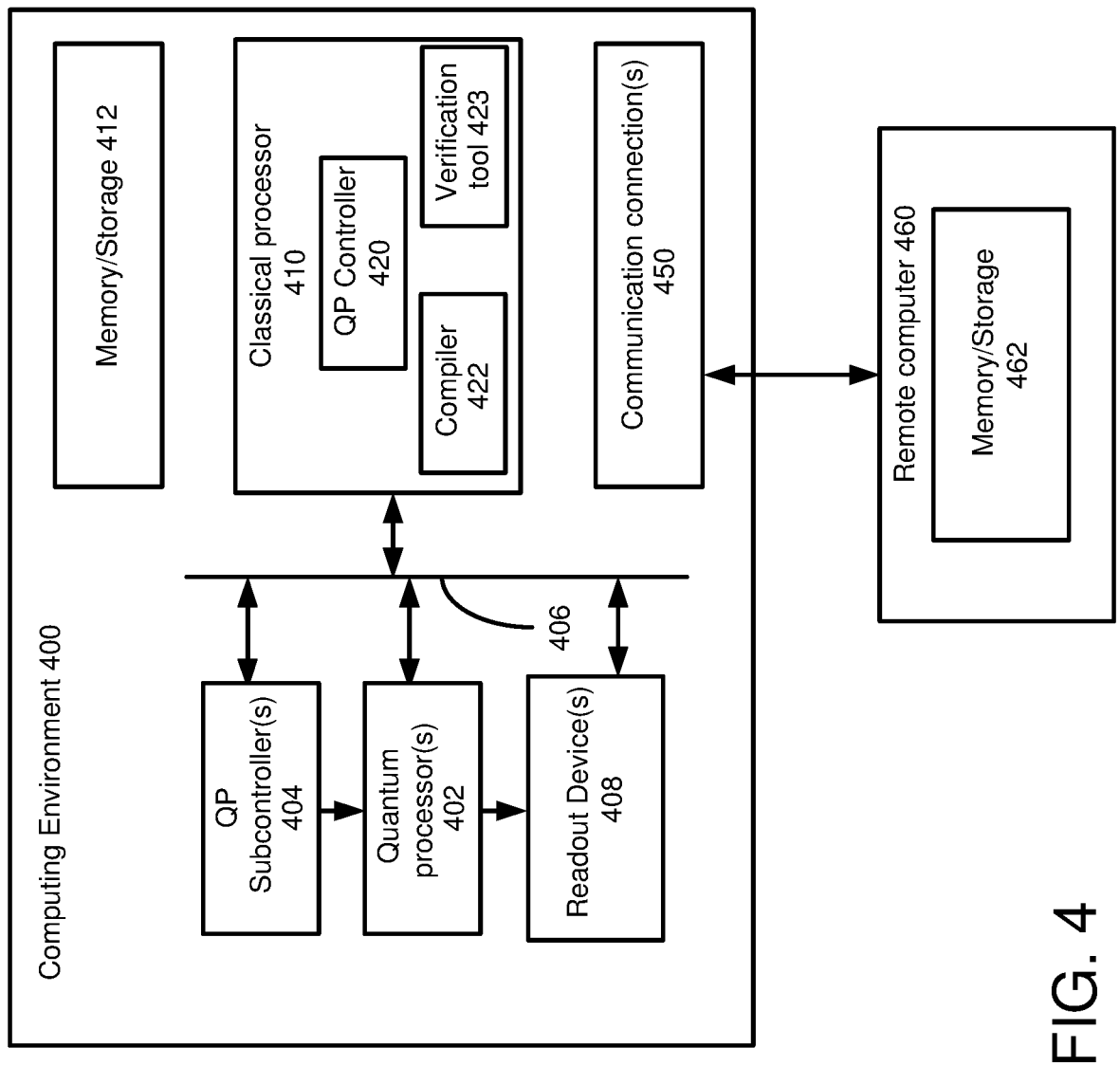
FIG. 4 illustrates an exemplary system for implementing the disclosed technology in which the system includes one or more classical computers in communication with a quantum computing device.
Figure 5:
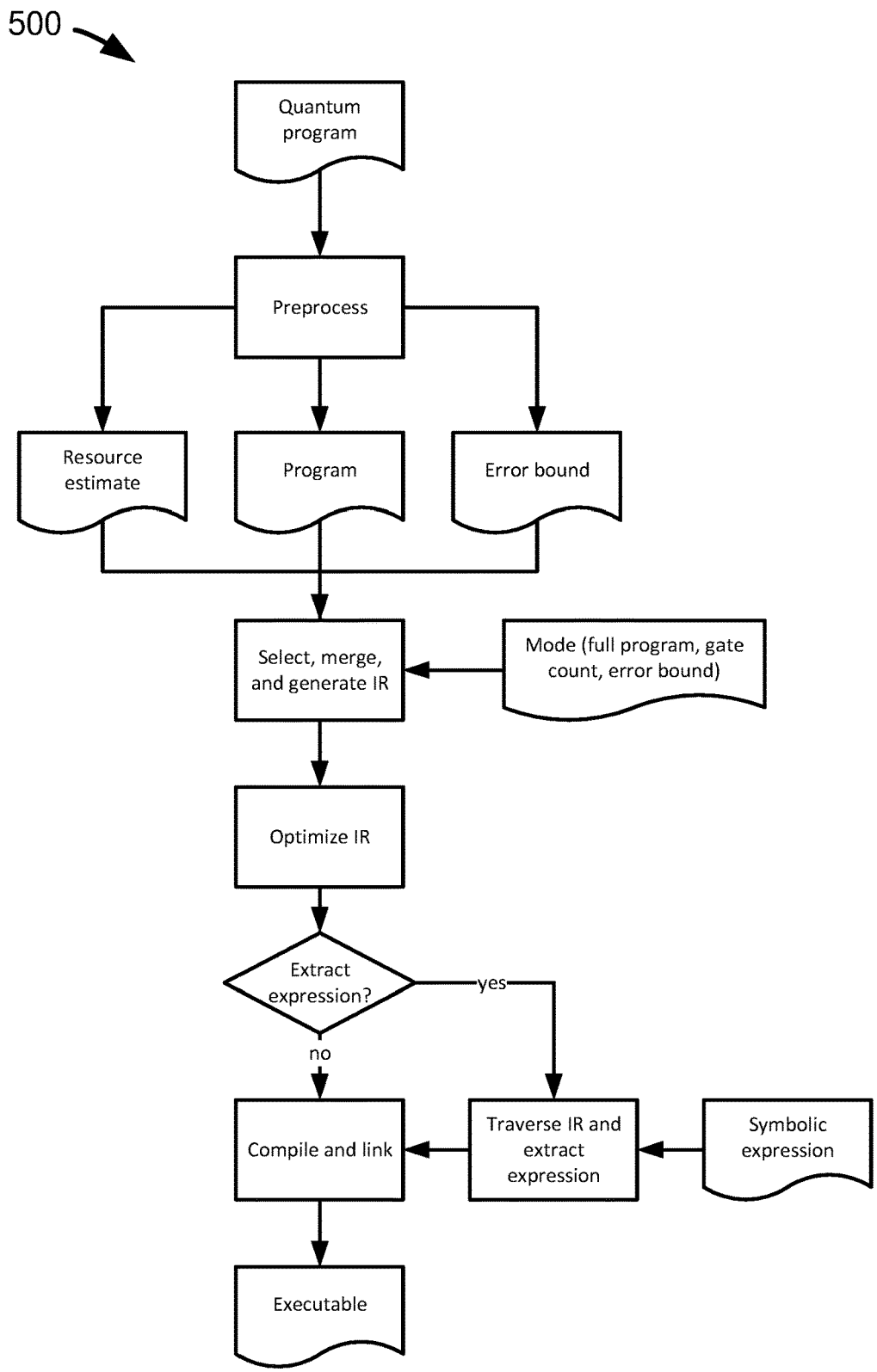
FIGS. 5-6 are flow charts for performing example embodiments of the disclosed technology.
Figure 6:
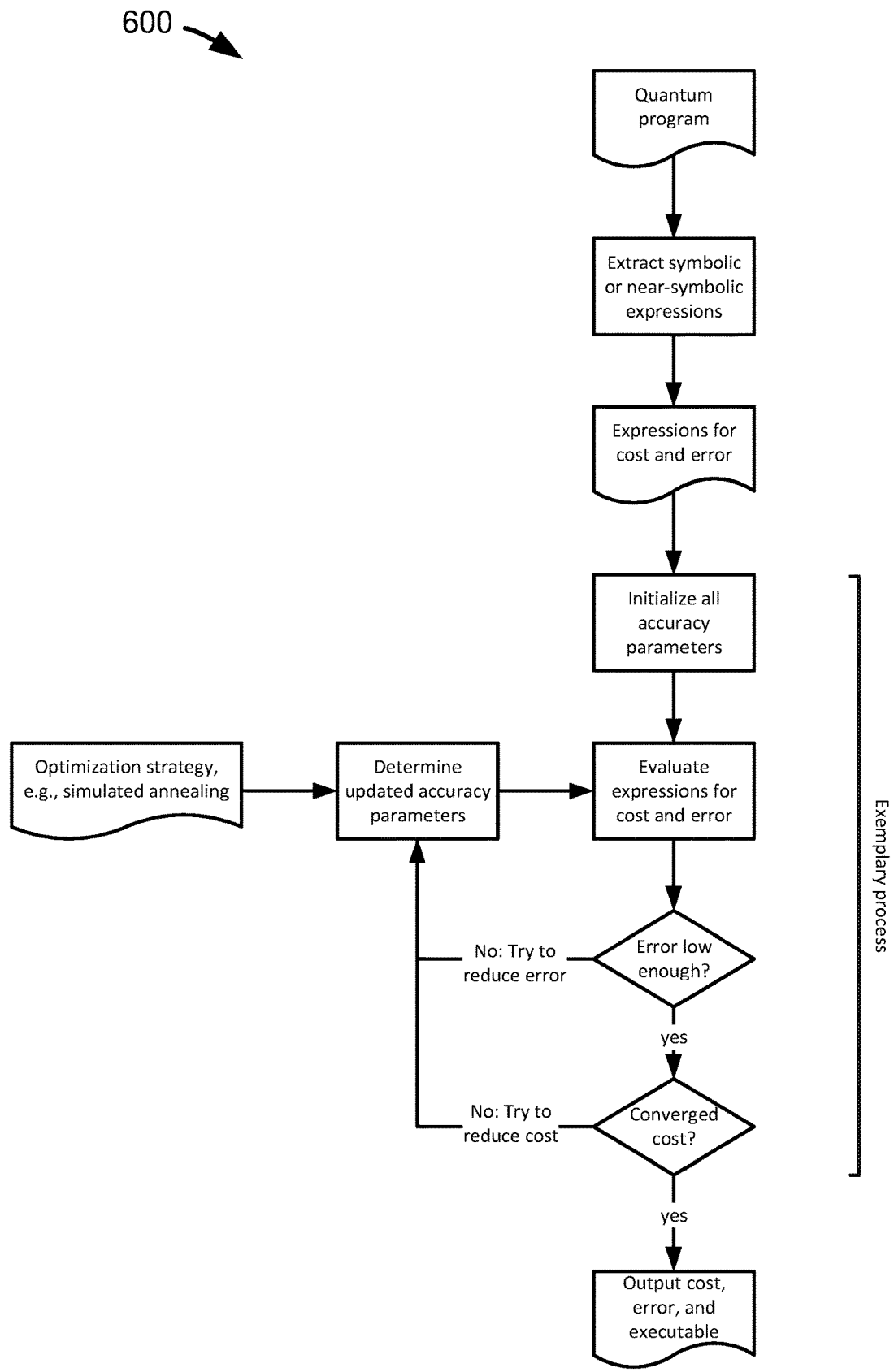

With reference to FIG. 4, an exemplary system for implementing the disclosed technology includes computing environment 400. In computing environment 400, a compiled quantum computer circuit description (including quantum circuits for performing any of the disclosed techniques as disclosed herein) can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using *Majorana* zero modes). The precompiled quantum circuits, including any of the disclosed circuits, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein or resulting from any of the disclosed techniques). The compilation can be performed by a compiler 422 using a classical processor 410 (e.g., as shown in FIG. 4) of the environment 400 which loads the high-level description from memory or storage devices 412 and stores the resulting quantum computer circuit description in the memory or storage devices 412.

In other embodiments, compilation and/or verification can be performed remotely by a remote computer 460 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. Still further, the remote computer 400 can store the high-level description in the memory or storage devices 462 and transmit the high-level description to the computing environment 400 for compilation and use with the quantum processor(s). In any of these scenarios, results from the computation performed by the quantum processor(s) can be communicated to the remote computer after and/or during the computation process. Still further, the remote computer can communicate with the QP controller(s) 420 such that the quantum computing process (including any compilation, verification, and QP control procedures) can be remotely controlled by the remote computer 460. In general, the remote computer 460 communicates with the QP controller (s) 420, compiler/synthesizer 422, and/or verification tool 423 via communication connections 450.

In particular embodiments, the environment 400 can be a cloud computing environment, which provides the quantum processing resources of the environment 400 to one or more remote computers (such as remote computer 460) over a suitable network (which can include the internet).

VI. Concluding Remarks

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method, comprising:
   compiling a high-level description of a quantum-computer program into a lower-level description implementable by a quantum computer,
   wherein the compiling comprises using a built-in language construct that allows specifying approximation errors introduced by a particular quantum-computer implementation associated with the lower-level description.

2. The method of claim 1, further comprising an automatic rewrite step that transforms the high-level description of the quantum-computer program to count gates.

3. The method of claim 1, further comprising an automatic rewrite step that transforms the high-level description of the quantum-computer program to compute the overall error bound.

4. The method of claim 1, further comprising an automatic rewrite step that transforms the high-level description of the quantum-computer program to count gates and transforms the high-level description of the quantum-computer program to compute the overall error bound.

5. The method of claim 1, further comprising an automatic rewrite step that comprises calling an optimizer that then forwards optimized parameters for execution.

6. The method of claim 5, wherein the optimizer implements a simulated annealing procedure.

7. The method of claim 1, further comprising:
   performing one or more rewrite actions that transform the high-level description of the quantum-computer program to count gates or transform the high-level description of the quantum-computer program to compute the overall error bound; and
   performing an optimization process to loops arising from the one or more rewrite actions, wherein the optimization process comprises ignoring floating-point errors.

8. The method of claim 1, further comprising:
   performing one or more rewrite actions that transform the high-level description of the quantum-computer program to count gates or transform the high-level description of the quantum-computer program to compute the overall error bound; and
   performing an optimization process to loops arising from the one or more rewrite actions, wherein the optimization process comprises turning one or more looped sums into a product.

9. The method of claim 1, further comprising performing one or more rewrite actions that transform the high-level description of the quantum-computer program to count gates or transform the high-level description of the quantum-computer program to compute the overall error bound,
   wherein the performing the one or more rewrite actions that transform the high-level description of the quantum-computer program to count gates or transform the high-level description of the quantum-computer program to compute the overall error bound is performed iteratively.

10. The method of claim 1, wherein the one or more rewrite actions are interleaved with one or more of a re-association pass or loop simplification pass.

11. A system, comprising:
    a processor; and
    a computer-readable medium storing processor-executable instructions, which when executed by the processor cause the processor to implement a compiler for translating a high-level quantum-computer program to a lower-level quantum-computer, wherein the translating comprises:
traversing the high-level quantum-computer program;
generating one or more symbolic expressions of the high-level quantum-computer program based on the traversal of the high-level quantum-computer program; and
specifying approximation errors and gate counts associated with each of the one or more symbolic expressions.

12. The system of claim 11, wherein the traversal of the high-level quantum-computer program is the high-level quantum-computer program's end to its beginning.

13. The system of claim 11, wherein the traversal of the high-level quantum-computer program considers constants and inputs to the high-level quantum-computer program.

14. The system of claim 11, wherein the traversal supports looped sums and generates symbolic expressions for the looped sums.

15. A method, comprising:
inputting a high-level quantum-computer program; and
establishing one or more accuracy parameters of the quantum program with a single invocation of a compiler for the high-level quantum-computer program.

16. The method of claim 15, wherein the establishing comprises generating a symbolic expression for one or more aspects of the high-level quantum-computer program.

17. The method of claim 16, wherein the establishing comprises transforming at least a portion of the high-level description of the quantum-computer program to count gates.

18. The method of claim 16, wherein the establishing comprises transforming at least a portion of the high-level description of the quantum-computer program to compute an overall error bound.

19. The method of claim 15, wherein the establishing comprises performing a simulated annealing procedure.

* * * * *